May 18, 1948. A. G. OGDEN 2,441,899
PHOTOGRAPHIC COMPOSING MACHINE HAVING A PLURALITY
OF SETS OF CHARACTER BEARING SLIDES
Filed May 30, 1945 9 Sheets-Sheet 1

INVENTOR.
ASHLEY G. OGDEN
BY Robert Irving Williams
ATTORNEY.

May 18, 1948.　　　　A. G. OGDEN　　　　2,441,899
PHOTOGRAPHIC COMPOSING MACHINE HAVING A PLURALITY
OF SETS OF CHARACTER BEARING SLIDES
Filed May 30, 1945　　　　9 Sheets-Sheet 2

May 18, 1948. A. G. OGDEN 2,441,899
PHOTOGRAPHIC COMPOSING MACHINE HAVING A PLURALITY
OF SETS OF CHARACTER BEARING SLIDES
Filed May 30, 1945 9 Sheets-Sheet 3

INVENTOR.
ASHLEY G. OGDEN
BY Robert Irving Williams
ATTORNEY.

May 18, 1948.    A. G. OGDEN    2,441,899
PHOTOGRAPHIC COMPOSING MACHINE HAVING A PLURALITY
OF SETS OF CHARACTER BEARING SLIDES
Filed May 30, 1945    9 Sheets-Sheet 4

INVENTOR.
ASHLEY G. OGDEN
BY Robert Irving Williams
ATTORNEY.

May 18, 1948. A. G. OGDEN 2,441,899
PHOTOGRAPHIC COMPOSING MACHINE HAVING A PLURALITY
OF SETS OF CHARACTER BEARING SLIDES
Filed May 30, 1945 9 Sheets-Sheet 8

INVENTOR.
ASHLEY G. OGDEN
BY Robert Irving Williams
ATTORNEY.

May 18, 1948. A. G. OGDEN 2,441,899
PHOTOGRAPHIC COMPOSING MACHINE HAVING A PLURALITY
OF SETS OF CHARACTER BEARING SLIDES
Filed May 30, 1945 9 Sheets-Sheet 9

INVENTOR.
ASHLEY G. OGDEN
BY Robert Irving Williams
ATTORNEY.

Patented May 18, 1948

2,441,899

UNITED STATES PATENT OFFICE 2,441,899

PHOTOGRAPHIC COMPOSING MACHINE HAVING A PLURALITY OF SETS OF CHARACTER BEARING SLIDES

Ashley G. Ogden, Baltimore, Md., assignor to William W. Darsie, Baltimore, Md.

Application May 30, 1945, Serial No. 596,744

15 Claims. (Cl. 95—4.5)

This invention relates to photographic composing machines and more particularly to the adaptation of typewriters to the making of printed copy. An object of the invention is to combine the relative simplicity of typewriting with the regularity and adaptability of composed printing. Among the other objects of the invention are the provision of means for pre-viewing each typed line, the provision of accurate means for registering and/or measuring variations in letter width, the provision of simple and effective case-shift means, and the provision of accurate photographic means and of accurate justifying means associated therewith. An additional object is the provision of an arrangement whereby characters may be selected for one line at the same time that the photographing of a previously set line is taking place. A further object is the provision of a machine which is simple, sturdy and durable in construction and operation and which is at the same time highly effective and efficient.

In accordance with the invention character bearing elements are maintained throughout the entire selecting and photographing operations in position for positive return to an original arrangement thus avoiding reliance on any type-sorting mechanism.

Further in accordance with the invention individual type characters may be composed into reading matter, viewed, and photographed character by character and line by line into justified columns or page form.

The invention accordingly comprises the several steps and the relation and order of one or more of such steps with respect to each of the others, the apparatus embodying features of construction, combinations and arrangement of parts, adapted to effect such steps, and the article which possesses the characteristics, properties or relation of elements, all as exemplified in the detailed disclosure hereinafter set forth, the scope of the application thereof being indicated in the claims.

For a fuller understanding of the nature and objects of the invention, reference should be had to the following detailed description taken in connection with the accompanying drawings, in which.

Figures 1, 12:
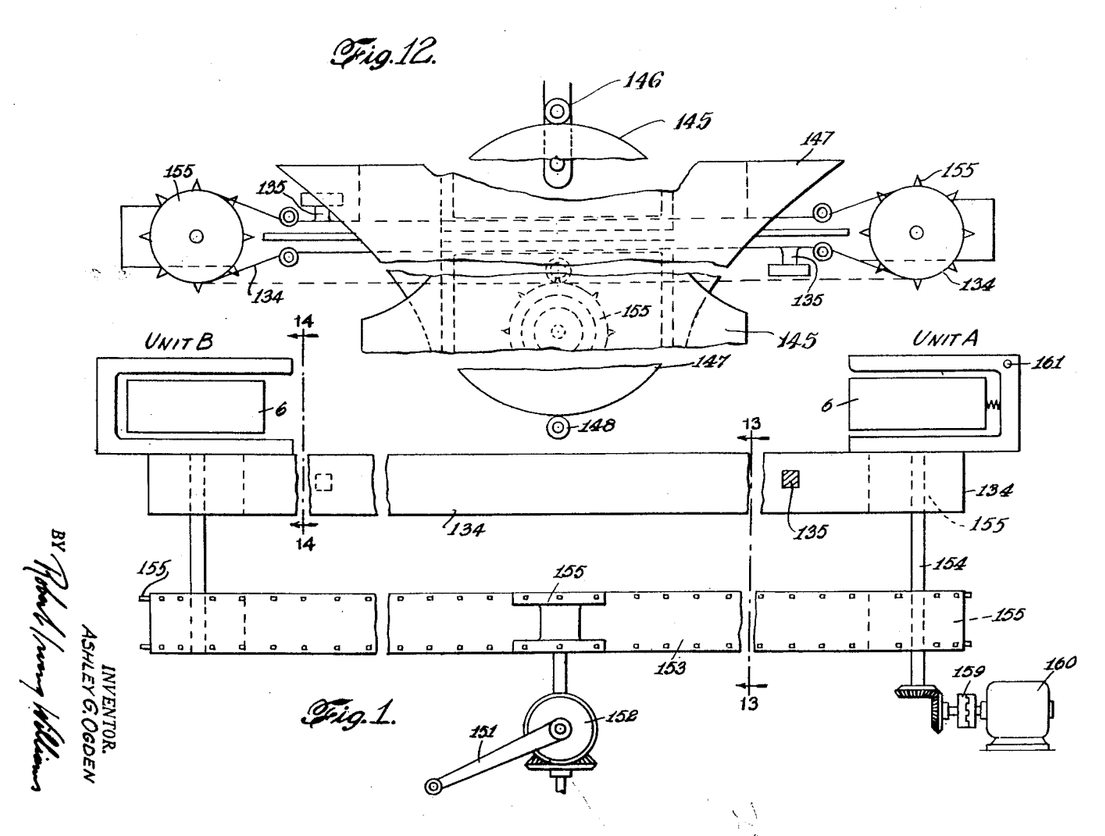
Figure 1 is a diagrammatic side view of one form of mechanism embodying the invention.
Fig. 12 is a plan view of the carriage-interchange mechanism.

In the present exemplification as shown in Figure 1, the machine comprises two units—a composing unit A and a photographing unit B—each adapted to receive either of two interchangeable carriages. This arrangement enables a line to be set up while the previous line is being photographed and affords a high degree of efficiency in practical operation. In instances, however, when speed is of less importance than initial expense, a single-unit machine may be used; and in instances where special factors are present a multiple unit machine may be found advantageous.

THE SELECTING MECHANISM

Figures 2, 3, 5, 6, 7, 8:
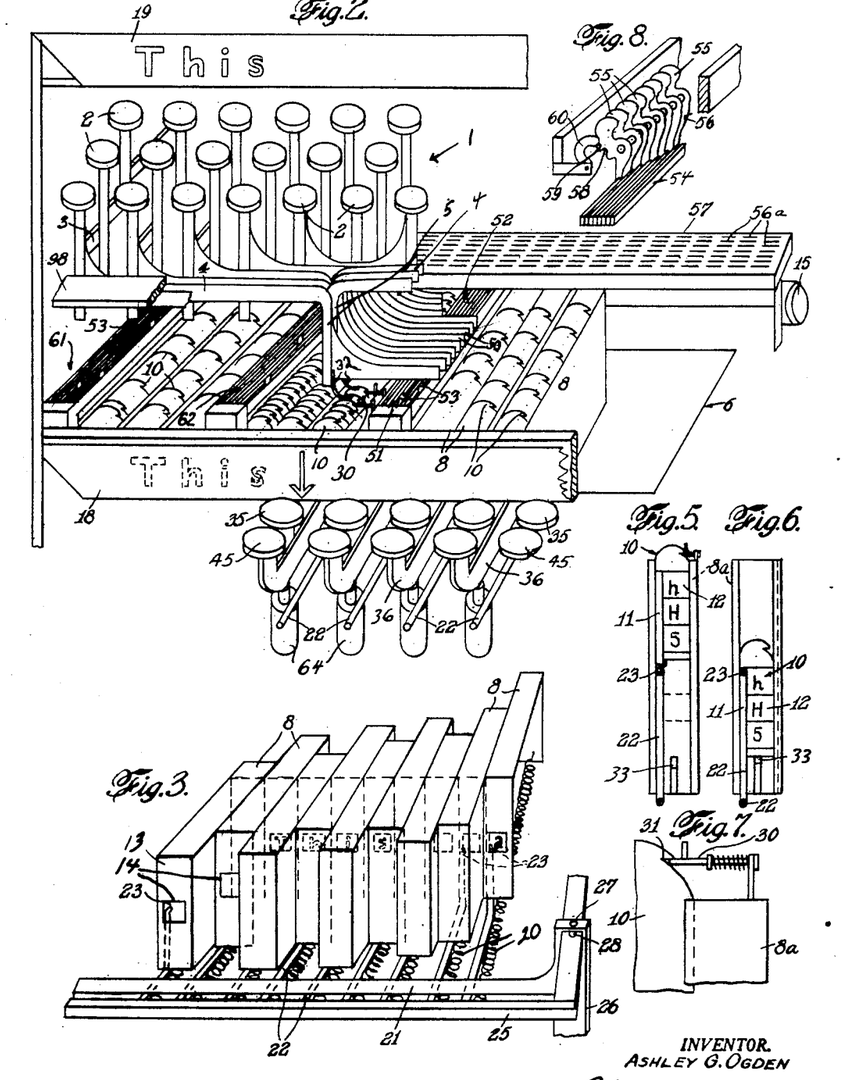
Fig. 2 is a front perspective cut away view of the character-selecting mechanism.
Fig. 3 is a similar view of a portion of this mechanism after the operation of the aligning means.
Fig. 5 is a detail view of one of the character-bearing slides.
Fig. 6 is a similar view showing the slide in another position.
Fig. 7 is an enlarged detail view of slide-release catch.
Fig. 8 is a detail of one set of registration members.
Figure 4:
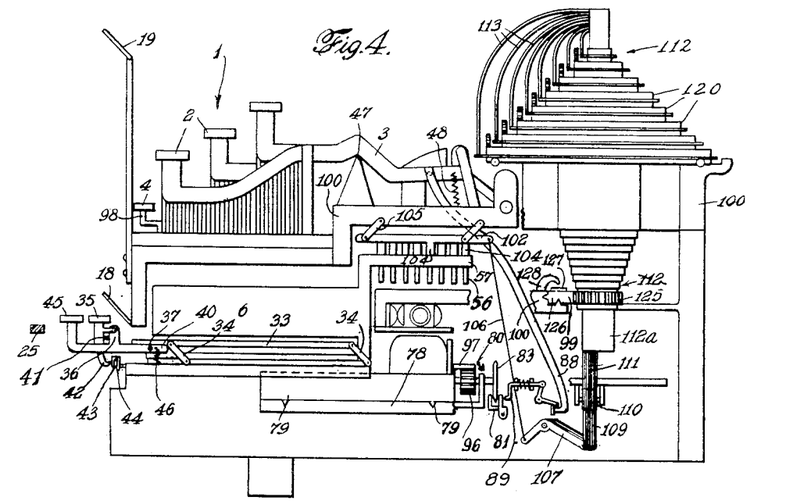
Fig. 4 is an end view taken from the right hand side of Fig. 1.
Figure 13:
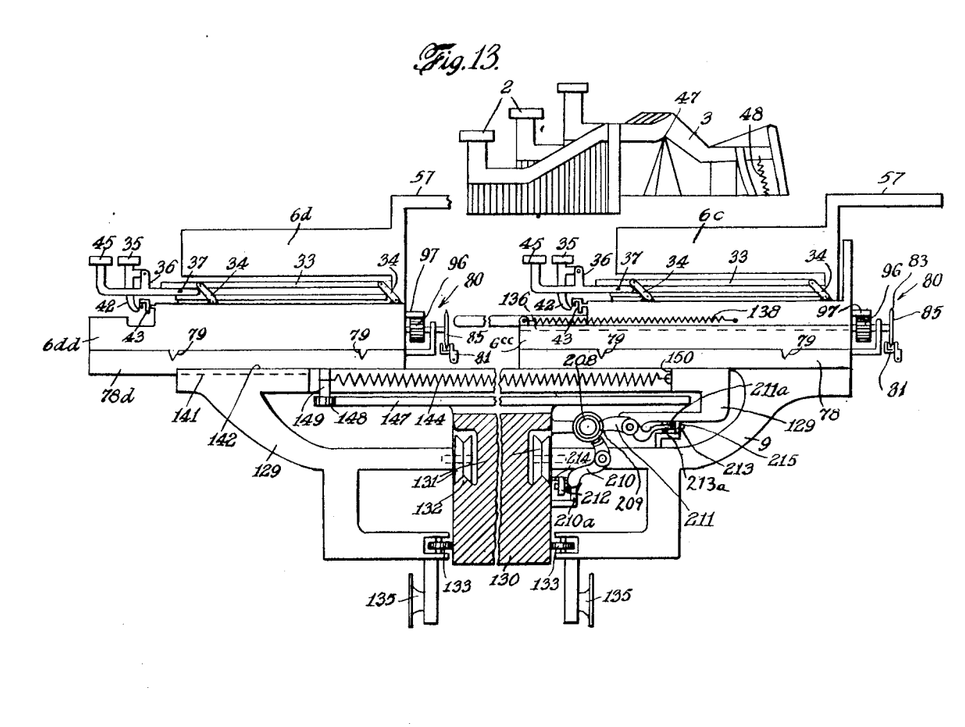
Fig. 13 is a partly sectional view on the line 13—13 of Figure 1 with the carriages in passing position.

The unit A as exemplified in Figs. 2, 3 and 4 comprises a keyboard 1 having a suitable number of keys, for example thirty, which as exemplified are arranged as in a double shift typewriter keyboard but which may be arranged in any of a wide variety of suitable ways. Each key 2 carries a rearwardly extending restorer arm 3 and also a laterally extending selector arm 4 having a downward extension 5. Movable beneath the selector arms is a carriage 6 on which are a series of font holders 8. A pair of interchangeable carriages are provided in the machine in the present instance, the one shown in Fig. 2 being on a frame 9 as shown in Figure 13. When the carriage on frame 9 is under the keyboard in unit A, the other carriage will be at the unit B. The carriage is movably mounted in the units to permit one holder after another to be brought under the extensions 5. Each holder has a suitable number of guideways 8a, as for example thirty-one, and in each of thirty of these guideways is a slide 10 formed with a group of characters to be photographed, one slide 10 in each row being provided for each key 2. The thirty-first slide is operable by a spacer bar. The key representing the letter "H" and the figure "5" will operate a slide 10 carrying the characters "h" and "H" and "5" as shown. There will be an "H" slide in the same position in every row, and each "H" slide will ordinarily be similar to every other "H" slide. The number of rows will depend on the maximum number of letters which it will be desirable to print in a single line. Each slide in the present instance is composed of a frame portion 11 and a transparent sheet 12 on which the characters are formed (Figs. 5 and 6). Each slot is at least twice the total length of the three indicia and in the present instance each font holder is considerably deeper than twice the entire length of the slide. On each sheet 11, there will be a plurality of photographable indicia, e. g., a lower case letter, an upper case letter, and a figure or symbol.

If it is desired to print italics or other type modifications, each transparent sheet 11 may be made long enough to include one or more of the number of keys and the number of slides in a row may be increased to include these.

On a line below the lower ends of the slides (when the latter are in the position of Fig. 5) the front walls 13 of the holders 8 are formed with openings 14, one opening being provided at the front of each row. A slide can be dropped a sufficient amount to bring any one of the indicia on the slide in line with this opening. Thus, as shown in Fig. 6, if a slide 10 is dropped all the way, a lower case letter may be viewed through the opening. If, however, it is dropped one-third less than all the way, an upper case letter will appear; whereas if it is dropped two-thirds less than all the way a figure will appear.

Lighting means, for example a mercury lamp 15, is provided to throw light on the rear of the transparent panels of whichever slides have dropped. There may be provided means to alter the relative vertical positions of the operator and the machine to permit the operator to view readily a line which he has set, but preferably, and as exemplified, there are provided means to assist in the viewing of the characters as typed while the operator is at the keyboard. This means may be transparent screen means such as magnifying and angulating lens plates, or as shown in Figs. 2 and 4 there may be provided a reflecting mirror 18 and a viewing mirror 19 above it. If lens plates are used it is desirable when practical that their magnification be such as to wipe out in part at least the differentiation in apparent size of the letters on a slide near the front of a row and of the letters on a slide near the rear of a row. Preferably, however, the character-bearing elements or their holders such as the holders 8 are mounted for movement laterally of the carriage to permit their position to be adjusted after a line has been set so as to bring the slides into line. To this end each holder is provided with a spring 20 which urges it forwardly against the stop bar 21, and there are provided means including rods 22 for pressing against the frame portions 11 of whatever slides have been dropped so as to move them to a given position rearwardly. The rods are of such length as to reach, when projected, just to the rearmost slide in the present instances, or, if desired, to a plane further to the rear; and their inner ends 23 are in such vertical position that they will contact any slide which has been dropped and will move it to the normal position of the rearmost slides or other desired plane. Thus all the slides will be aligned in a plane, as, for instance, that of the rearmost slides. The rods are desirably mounted on a frame 25 which is slidably supported in brackets 26 carried by the carriage 6. Instead of the entire set being moved, only the slide which is selected may be moved, any suitable means to this end being employed. Desirably the frame is equipped with a releasable catch, such, for instance, as the catch 27 movable into a notch in the bar 28 to retain the selected slides in aligned position during the photographing thereof and during such movements as the carriage may undergo.

The slides are normally held in their upper position by spring catches 30 (Fig. 7) projecting from the holders 8 into notches 31 in the slides; and the arms 4 have catch-releasing springs 32. Alternatively, the slides may be made of magnetizable material and a magnetic bar employed to normally hold these slides in their upper position. In this case, the elements 5 are desirably made of non-magnetic material. Regardless of what releasable supporting means is employed, whenever a key 2 is operated the extension 5 of its arm 4 presses down against the top of one of the slides, pushing the slide loose to permit it to fall.

Pursuant to the invention there are provided case-shift means for controlling the amount which a slide will drop. In the present exemplification there is provided for each row of slides, as shown in Fig. 2, a parallel bar 33 connected to the carriage 6 by links 34 and operated by a shift key 35 arranged to serve also as a shift lock. The key 35 is pivotally carried on an arm 36 which is pivotally mounted at 37 so that its rearward end 40 will lift the parallel bar 33 when the key is depressed. The key 35 has a lock arm 41 formed with a hook 42 adapted to be caught under notches 43 and 44 and to be retained thereby until released by a release key 45 on the arm 36. The end 40 is drawn downwardly by a spring 46. Since the hook will click as it passes into the notches, the operator can, by ear as well as by feel, ascertain as to whether he is moving the key two notches for figures or only one notch for upper case.

By pushing the key 45 all the way down, a slide may be restored either individually for correction or along with the other slides for restoration.

The rearwardly extending arms 3, as will be seen, are sufficiently above the lateral arms 4 to provide clearance for the various key strokes. The arms 3 are pivoted at 47 and are provided with springs 48 to return the keys to their normal position.

THE WIDTH REGISTER MECHANISM

Since type faces can be divided into widths of from one to eight units, any means for measuring the length of a set-up line or for determining the extent of movement of the light sensitive material in a camera can be operated by grouping all characters (letters, figures, and symbols) into those of one, two, three, four, five, six, seven or eight units in width. For example, periods (.) are one unit in length and m, w, and M and W are eight units in width. All characters of the same width may, of course, be treated similarly. In order to register the extent of a line being struck off so as to obtain a preliminary measure of the total width of the characters in a line or to obtain a proper movement of the sensitized material in a camera, or, as in the present instance, to obtain both these results, there is provided register mechanism which as exemplified is duplicated in the two carriages but which in a single keyboard machine may consist of a single register mechanism for use first in a measuring operation and second in a photographing operation in the same unit or for use only in the photographing of a line otherwise measured.

Accordingly, as will be seen from Fig. 2, a horizontal extension 50 is provided on each extension 5 of the arms 4, and under the extensions 50 there is a set 51 of eight lever arms 52 representing respectively one, two, three, four, five, six, seven, and eight width units. Each lever arm has a plurality of butts 53 so disposed that each key 2 having a lower case letter of a particular number of units in width will always operate the same lever arm of the set 51. For instance, the lever arm representing eight units will have butts extending upwardly under those extensions which are connected with the keys for w and m.

The rear end of each lever arm is movable above an arm 54 (Fig. 8) so that the depression of a butt will select and depress the arm 54 and project upwardly the forwardly extending end 55 of one of a set of pivoted registration members 56 thru a slot 56a in a shelf 57 forming part of the carriage 6. A spring under each lever arm restores it as soon as the member 56 is moved. The members 56 may be restored manually or by suitable automatic means after they have served their purpose in the units A and B. Each member 56 is formed with notches 58 and 59 and there is provided a cooperating catch 60 to hold the member 56 in whichever position it may be pushed.

There is one set of members 56 for each set of slides 10, so that the selection of the characters to be photographed is stored in the members 56. In order, if the shift key has been pressed, that the selections stored will correspond to the width of an upper case letter or of a figure as the case may be, rather than with the width of a lower case letter, there are provided two other sets 61 and 62 of lever arms 52, and means are provided for moving them when the shift lock key is operated.

Figure 9:
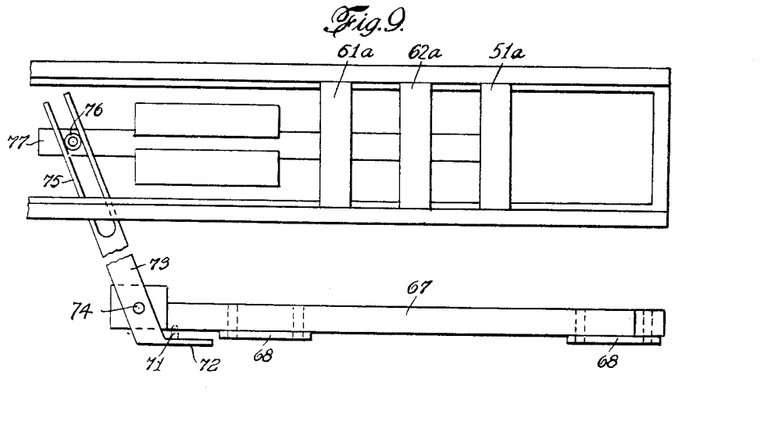
Fig. 9 is a top view of shift mechanism for the actuators of the registration members.
Figure 10:
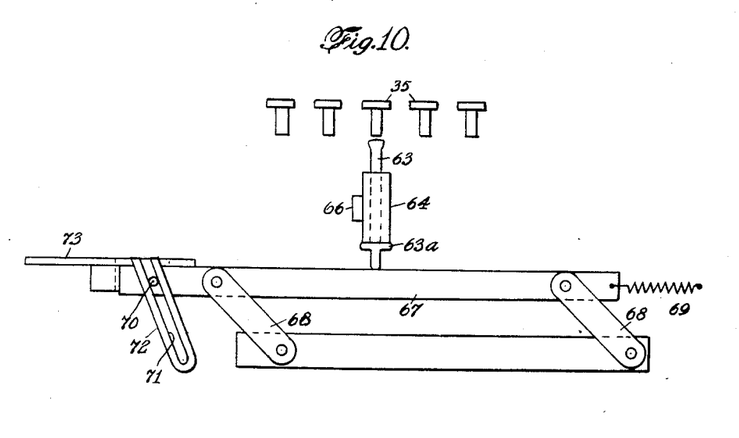
Fig. 10 is a front view thereof.

In the path of the downward movement of whichever shift lock key 35 is alined with the springs 32, there is provided a plunger 63 which is movable downwardly with the key 35, (Figs. 2, 9 and 10). This plunger is mounted for vertical movement in a guide 64 mounted on a bracket 66 forming a part of the unit A. The plunger rests on a "parallel" bar 67 supported by links 68 and urged upwardly by a spring 69. A pin 70 on the bar 67 rides in a slot 71 of the diagonally extending end 72 of a lever 73. This lever is pivoted at 74 and its remote forked end 75 embraces a pin 76 on a frame 77 which is slidably mounted on the carriage 6. It is the frame 77 which carries the beds 51a, 61a and 62a in which there are supported the sets 51, 61 and 62 of lever arms 52. Thus whenever a key 35 is depressed one notch the bar 67 will be moved sufficiently to move the frame 77 so as to bring the bed 51a out of position and the bed 16a into position. When, however, a key 35 is depressed two notches, the bar 67 will be moved twice as far and the frame 77 moved far enough to bring the bed 62a into position. As soon as movement of the carriage slides the depressed key 35 from above the plunger 63, spring 69 restores the bar 67 and the plunger 63. The latter is provided with a stop 63a to limit its upward movement.

THE CARRIAGE MOVING MECHANISM

Figures 4A, 14B:
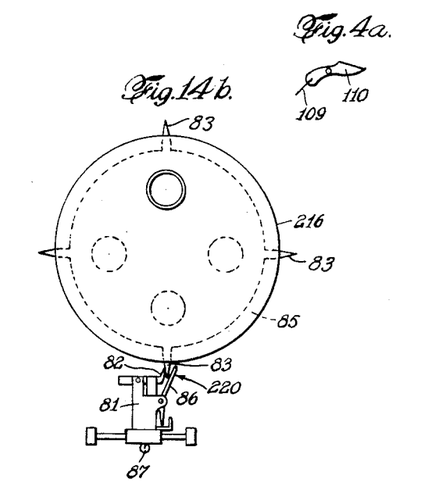
Fig. 4a is a detail view of one of the swingable elements.
Figs. 14a and 14b are enlarged detail views of the camera-shutter escapement.

While a wide variety of means for moving the carriage in a number of manners may be used without departing from the invention in its broader aspects, there is employed in the present instance means for moving the carriage unitary amounts step by step. As exemplified, the carriage 6 rests on a support 78 (Figs. 4 and 13) which is guided for longitudinal movement on the frame 9 by grooves 79, and its movement is controlled by the escapement 80. The escapement is similar to that shown in detail in Figs. 14a and 14b, and reference is had to those figures for the description thereof. A pivoted member 81 is swung to move element 82 out of the path of one tooth 83 on the wheel 85, while another element 86 is moved under the path of the next tooth, and holds it against movement until the element 82 moves back. Member 81 is held in normal position by the spring 87 and is operated through the medium of members 88 and 89 each time the key 2 is returned to normal position by its spring. A gear 96 rotates with the escapement wheel 85 and drives a rack 97 carried by support 78, the size of the gear being such that the carriage will advance enough to replace one holder 8 by the next one every time a key 2 is struck. In addition to the keys 2 there is a spacer bar 96 which also functions to drive the escapement 89, but which does not operate any lever arm 52 or register element 56.

WIDTH MEASURING MEANS

While it is possible to compute the extent of a line mathematically, and while in a one-unit machine the same mechanism may be used for the most part in measuring and in photographing a line, there is desirably provided, as in the present machine, means substantially duplicated in each unit for advancing a measuring element such, for instance, as the rack 99 carried by the mounting 100 of unit A and for advancing the sensitized material in unit B. This means, as exemplified in connection with the width measuring means in Figs. 4 and 11, comprises, eight escapements corresponding respectively to the eight lever arms 52 and eight registration members 56 and arranged to be operated by the latter. During the movement of the carriage, the selected registration members 56 are wiped by a set of eight bars 102 each having a butt 104 adapted to be operated by a particularly positioned one of the registration members of each set whenever that one has been selected and is in its upper position with its arm 55 projecting from its slot in the shelf 57. Each bar 102 has a butt in a different place and is adapted to be operated by a differently positioned member 56. Bars 102 are carried by links 105 on the mounting 100. Extending from the end of each bar 102 is a wire 106 running to a bell crank 107 from which a wire 109 extends to a swinging element 110 (Figs. 4 and 4a) so as to swing the same when a butt 104 contacts a raised registration element. Each element 110 is swingable against a vertical rod 111 of an escapement unit 112. Each rod extends upwardly to one of eight concentric tubes 112a (Figs. 4 and 11) each carrying connecting arms 113 and annulus 113a carrying actuator 114 for a pivoted trip member 114a (which is similar to the member 81 of an escapement 115 which is generally similar to the escapement 80). A shaft 116 turns with each escapement wheel 117 and turns a gear 118 meshing with a crown gear 119 on a ring 120. Each shaft 116 is carried on a bracket 121 mounted on the ring 120 next below that ring 120 which is operated by the shaft (except that the lowermost bracket is on a ring 122). From each of the eight rings 120 there extends cylinder 123 which is urged to rotate by a spring 124. The innermost cylinder carries at its lower end a driving gear 125 meshing with a rack 99 on a bar 126 having on its upper side a scale 127 which is movable past a pointer 128 carried by the mounting 100.

The teeth are differently spaced on each of the escapement wheels 117; the spacing of these and other factors, if any, being so adjusted that if a registration member 56 has been set by a one-unit key, the bar 126 will be advanced one unit whereas if a registration member 56 has been set by an eight-unit key, the bar 126 will be moved eight units, and the setting of the respective members 56 by two-, three-, four-, five-, six-, and seven-unit keys will result in moving the bar 126, two, three, four, five, six or seven units as the case may be. In case corrections are made, the operator will keep a record of these and will make suitable deductions from the reading on the bar.

As will be seen, each of the rings 120 is urged to move by a spring 124. However, none of them can move unless its own escapement or the escapement of a ring below it is released. Due to the arrangement of the brackets 121, the release of an escapement will release not only the ring controlled by its gear 118 but also the rings above it including the uppermost ring 120 on the cylinder 123 on which the gear 125 is mounted. Pursuant to this arrangement, whenever any escapement is released the uppermost ring and the innermost cylinder will rotate but the amount of rotation will depend upon the distance between two of the teeth on the particular escapement which was permitted to move.

Figure 11:
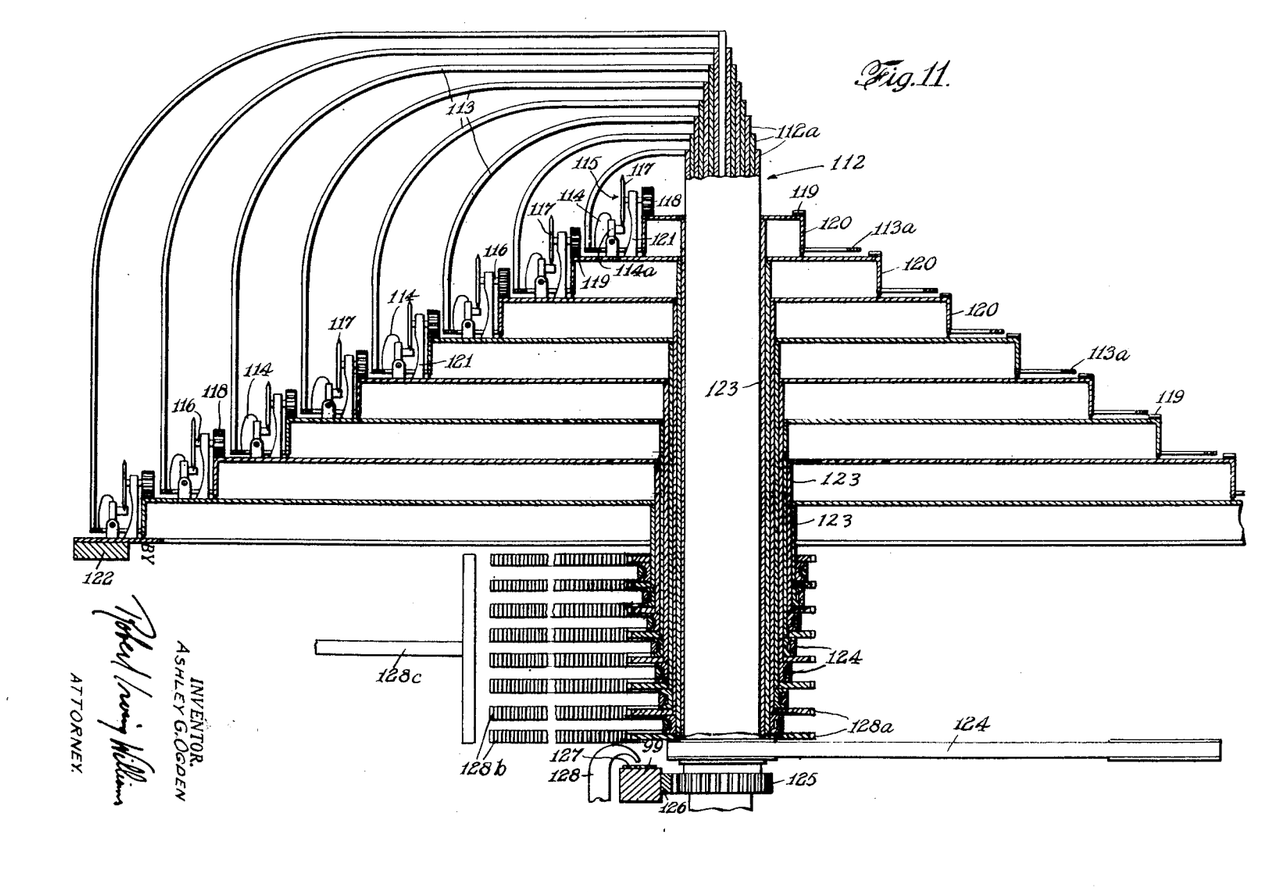
Fig. 11 is a detail view illustrating the measuring escapement assembly of Fig. 4.

The springs can be rewound and the escapement mechanism restored, after the measurement on the bar 126 has been utilized or recorded, by means such as the gears 128a, meshing with racks 128b operated by a return bar 128c, as shown in Fig. 11.

CARRIAGE EXCHANGE MECHANISM

As will be seen from Fig. 13, the frame 9 is disposed at one side of the longitudinal center line of the machine. Another and independent frame 129 is disposed at the other side. The frames ride on a supporting beam 130, being carried thereon by means of wheels 131, tracks 132 and rollers 133. The frames 9 and 129 are both connected to a belt 134 (Figs. 1 and 12) by members 135 in such manner that one of the frames 9 and 129 will move from the unit A to the unit B while the other moves from the unit B to the unit A. To enable the two carriages to pass without hitting, the upper portion 6c of one carriage is mounted by ball bearings in grooves 136 of a lower portion 6cc thereof for lateral sliding movement and is normally pressed into laterally centered position (Fig. 4) by a spring 138 (Fig. 13); and the upper portion 6d of the other carriage is built integrally with the lower portion 6dd which is mounted for longitudinal sliding movement on a member 78d, and the member 78d is mounted for lateral sliding movement on the frame 129. The lateral movement of the member 78d is guided by ball bearings in grooves 141 in the upper surface 142 of the frame 129. Springs 138 and 144 respectively serve to normally keep the carriages 6c and 6d centered. A cam 145 serves to engage a roller 146 to move the carriage 6c to the right (Fig. 13) as it leaves either the unit A or the unit B; and a cam 147 serves to engage a roller 148 to move the carriage 6d to the left (Fig. 13) as it leaves either the unit A or the unit B. The roller 148 is on a pin 149 moving in a longitudinal slot 150 in the frame member 129. As each cam is of sufficient width to move its respective carriage 6 to one side of the longitudinal center line of the machine, the carriages will pass without hitting. The belt 134 may be driven by a handle 151 thru gearing 152, belt 153, drive shafts 154 and sprockets 155. Desirably, there is also provided a clutch connection 159 to an electric motor 160 from a shaft 154. The motor 160 may be energized by a push button 161 or by two sets of automatic contacts engageable when the typing and the photographing of a line are completed respectively with an automatic cut-out.

PHOTOGRAPHING UNIT

Figure 14:
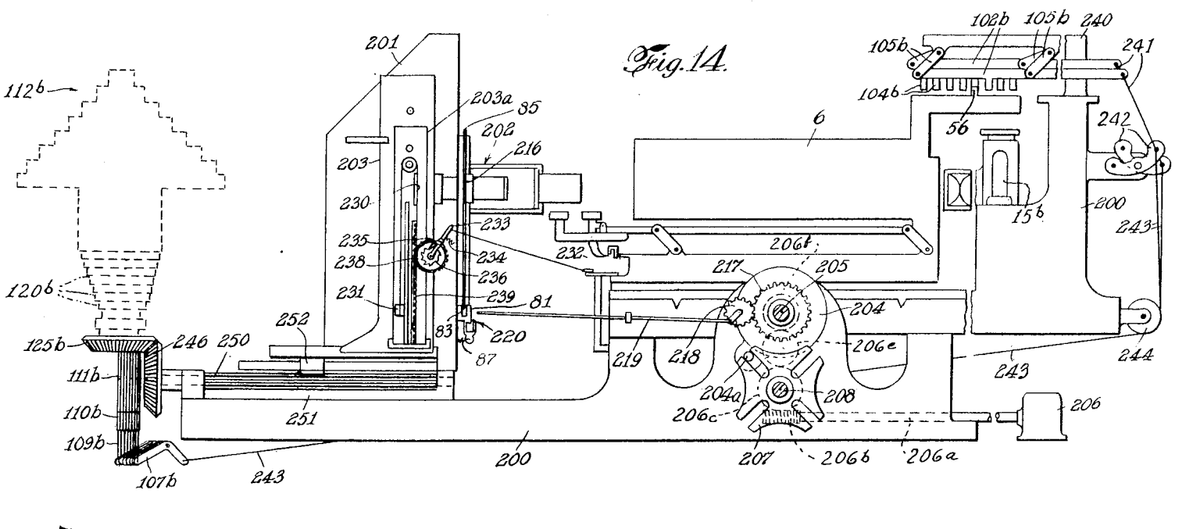
Fig. 14 is a sectional view along the lines 14—14 of Fig. 1 showing the photographing unit.
Figure 14A:
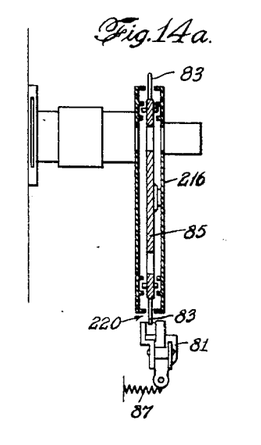

At unit B there is carried on a mounting 200, as shown in Fig. 14, a support 201 for camera 202 equipped with a longitudinally movable outer sensitized material holder 203 having an inner sensitized material holder 203a mounted for longitudinal movement therein.

Figures 13A, 13B:
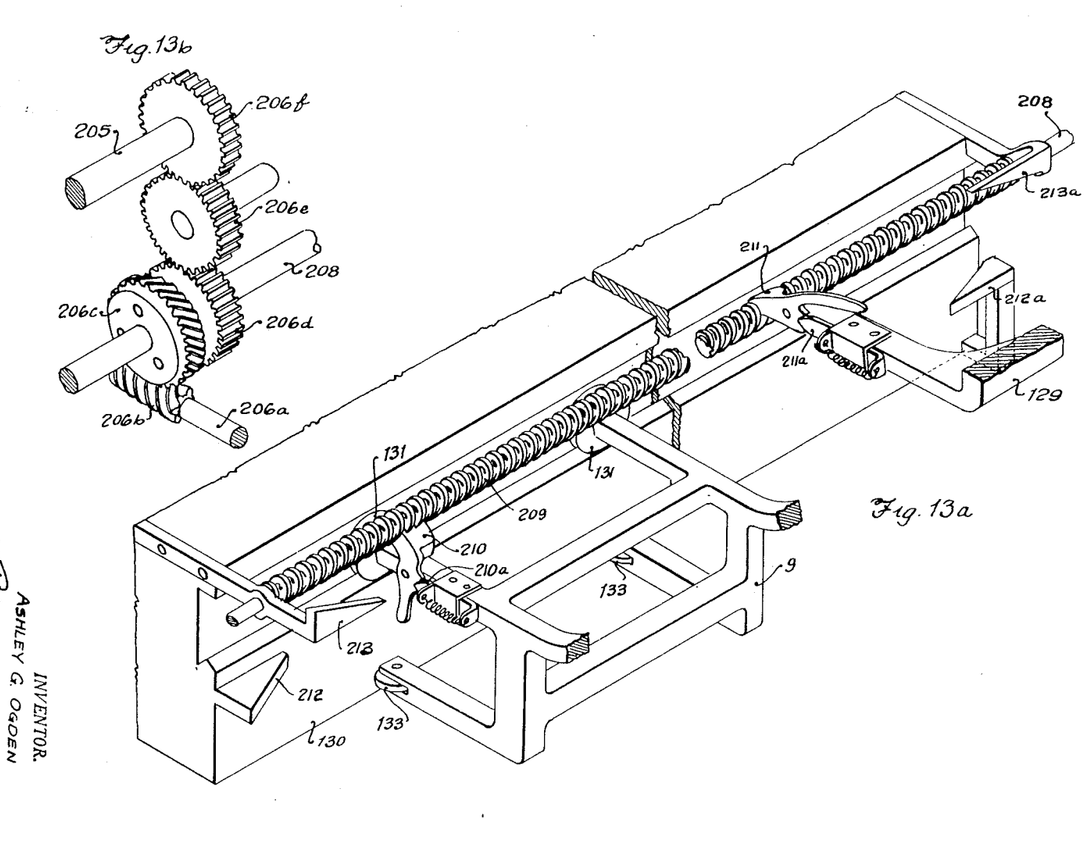
Fig. 13a is a fragmentary perspective view of the means for driving a carriage at photographing unit.
Fig. 13b is a fragmentary perspective view of the drive shaft of the Geneva mechanism.

To the end that uniformity of photographic results may be secured, a carriage 6 after its arrival in the unit B is driven by a Geneva drive providing exactitude of intervals for camera exposure between the stop-by-stop movements of the carriage. The wheel 204 carrying Geneva pin 204a is keyed to shaft 205 operated by an electric motor 206 through the medium of shaft 206a, worm 206b, and worm gear 206c carrying gear 206d both of which idle on shaft 208. Gear 206d drives gear 206e which drives gear 206f on shaft 205 (Figs. 13b and 14). Geneva wheel 207 is intermittently turned by the wheel 204 and turns shaft 208 intermittently. Shaft 208 carries worm 209 (Fig. 13) which is gripped by a split nut coupling 210 on frame 9 or by a split nut coupling 211 on frame 129 whenever one carriage or the other is moved into place in unit B. These couplings are caused to engage by means of trips 212 and 213 (Figs. 13 and 13a) respectively when one carriage or the other reaches unit B and are caused to disengage by one or the other of two other trips 212a and 213a after the photographing of a line is completed. Releasable retaining catches 210a and 211a are provided for the couplings 210 and 211. The camera shutter 216 is operated from the wheel 204 through the medium of gears 217 and 218, rod 219, and escapement 220 (Figs. 14, 14a and 14b) and comprising members 81—87 previously described. As the rod 219 is thrust to the left (Fig. 14) it pushes the pivoted trip 81 against the pull of the spring 87 and releases the tooth held thereby. The wheel 85, which provides the shutter mechanism 216 rotates a quarter turn. The operation of the shutter occurs during the inoperative part of the revolution of the Geneva wheel, whereas the operation described below occurs just before the completion of the active part of this revolution.

The inner holder 203a carries a sheet 230 of sensitised material, and a mercury lamp 15b is disposed behind the carriage to light up the indicia on the slides. The sheet 230 is supported for vertical movement and kept taut by a weight 231. Each time a carriage enters the unit B a trip 232 is actuated, causing movement of a lever 233 against pressure of a spring 234. The lever 233 carries a pawl 235 engaging a ratchet wheel 236 which carries a gear 238 engaging a rack 239 on the sheet 230 to move it down enough for the photographing of a new line.

As previously indicated, the holder 230 is advanced for the photographing of successive letters by means including the registration members 56 and an escapement mechanism. Eight bars 102b corresponding to bars 102 and having butts 104b are mounted by links 105b on a portion 240 of the mounting 200 so as to wipe the sets of registration members 56 which were previously selected when the carriage was in unit A and which were previously wiped by bars 102. Steel wires 241, which run to arms 242 and additional wires 143 running over pulleys 244 to bell cranks 107b and wires 109b extend from the respective bars 102b to swinging elements 110b corresponding to elements 110. Each of the eight elements 110b operates a rod 111b of an escapement mechanism 112b corresponding in all respects to the mechanism 112. The gear 125b of mechanism 112b which is similarly positioned to gear 125 of mechanism 112 and operates a gear 246 which is longitudinally extended to permit a sliding engagement with a rack 252 on the sensitized material holder 203 to move the holder just the width of each letter to be photographed.

THE JUSTIFYING MEANS

Figure 15:
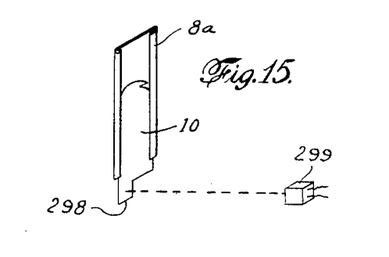
Fig. 15 shows the scanning means.
Figure 16:
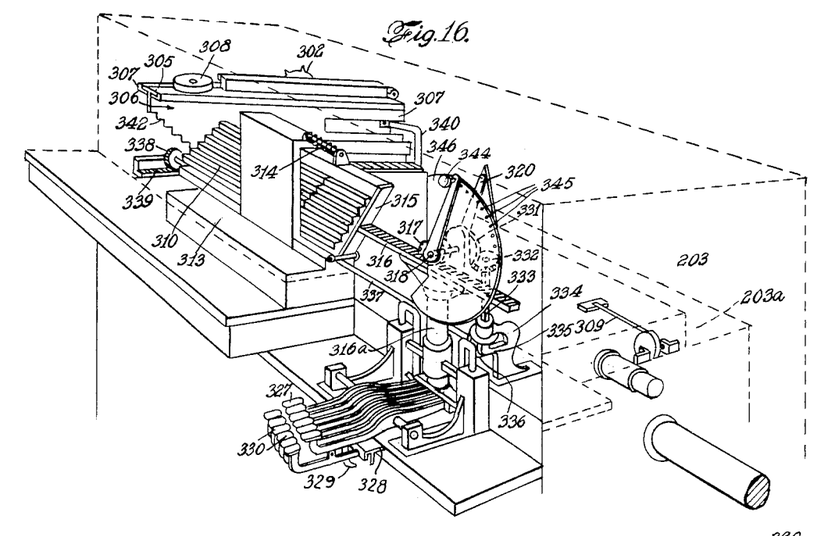
Fig. 16 is a perspective view of the justifying means.
Figure 17:
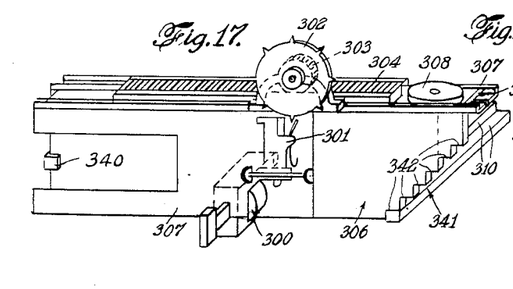
Fig. 17 is an end view thereof.

As above indicated one of the slides in each holder 8 is operated by the spacer bar 98. This slide is formed with an indicator 298 (Fig. 15) which when the holders are scanned by an electric eye 299 operates a solenoid 300 (Fig. 17) to swing the release member 301 of an escapement wheel 302. The escapement wheel 302 carries a gear 303 meshing with a rack 304 carried on the top plate 305 (Figs. 16 and 17) of a T-shaped unit 306 mounted for lateral sliding movement in a bracket 307 secured to the inner sensitized material holder 203a. Member 306 is urged rearwardly (Fig. 17) by a spring 308 on a bracket 307. Holder 203a is urged in the direction of movement of the carriage and of the outer holder 203 by a spring 309 secured to the outer holder 203.

Figures 18, 19:
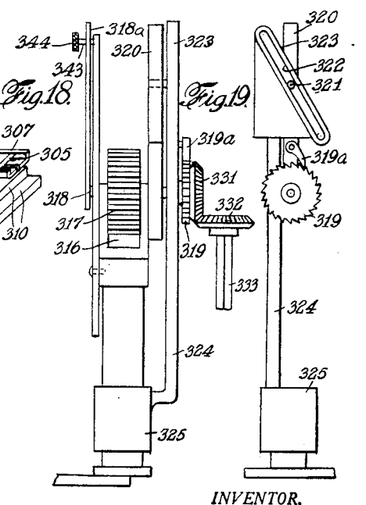
Fig. 18 is a detail view of the setting mechanism thereof taken from the near end.
Fig. 19 is a view from the right of Fig. 18.

Movement of the inner holder 203a is controlled by a set of dividing bars 310 which are supported by a shelf 313 on the outer holder 203 and are urged by a spring 314 against a swingable gate 315 which lies against the end of a rack 316 which is carried on a post 316a. Gear 317 meshing with rack 316 turns with shaft 318 carrying handle 318a. As is shown in greater detail in Figs. 18 and 19 there is freely rotatable on shaft 318 a ratchet wheel 319, which is operated by pawl 319a carried on arm 320 which is freely mounted on the shaft 318. A pin 321 on arm 320 fits into slot 322 in a plate 323 disposed on bracket 324 which extends from a sleeve 326 in which post 316a is vertically movable. Post 316a is movable vertically by one or another of a plurality (six in the present instance, but more when wide columns are to be set) of key levers 327 of different lengths, the amount of movement depending on which of the key levers is operated. Each key lever is provided with a stop 328, a locking means 329, and a release key 330.

Wheel 319 carries a bevel gear 331 meshing with bevel gear 332 carried on square shaft 333 which is vertically slideable in a split bracket 334 which provides a bearing for bevel gear 335. Gear 335 drives gear 336 which turns shaft 337 to which gear 338 meshing with rack 339 is keyed. From rack 339 bracket 340 extends to the T-shaped member 306. As will be seen the member 306 extends for a considerable distance laterally of the machine and at its forward edge (Fig. 16) is cut away at 341 step by step to provide notches 342 in proximity to the ends of the dividing bars so that the lateral position of the unit 306 and the position of the dividing bars will determine the extent to which the spring 309 can pull the inner sensitized material holder 203a to the stop provided by a dividing bar. Whenever the member 306 is cut away to provide a notch 342 opposite the end of any particular dividing bar, this bar will not act as a stop, though a higher one of the bars will. The position of the gate 315 will determine the position of the dividing bars and will consequently determine how much movement the spring 309 can impart to the holder 203a at each operation of the escapement 302 since if the gate is in a lowered position the ends of the respective bars will be a considerable distance apart whereas if it is in an upper position the ends of the respective bars will be a much smaller distance apart.

The handle 318a carries a pointer 343 in the form of a set screw adapted to be alined with one of a series of calibrations 345 on a disk-like scale 346 carried on the shaft 318. Thus if the scale 127 on bar 126 has indicated that a line is thirty units short the handle 318a will be moved to a position near that shown in Fig. 16 so that knob 344 is at the thirtieth recess on scale 346. This moves rack 316 to the right, lowering the gate 315. If there are five words in the line to be justified, the fourth key lever 327 will be depressed, with the result that the post is lifted just enough to raise the gate 315 to position the dividing bars to properly control the longitudinal movement of the unit at each of the four inter-word spaces. In other words, the more space, the more justifying movement per word, and the more words, the less justifying movement per word. At successive operations of the escapement 302, successive notches 342 are withdrawn to permit the member 306 to slip over successive dividing bars as the member 203a and its attachment 306 are drawn along by the spring 309. The arm 320, the rack 338, and the connecting gearing provide for the reverse movement of the member 306 and rewinding of the spring 306a.

OPERATION

Selector element

Each carriage is generally equivalent to a typewriter carriage, its escapement 83 being operated by the strokes of the keys 2. The carriage contains a number of rows of slotted boxes 8, each box containing (in the present instance) thirty character strips 10. All the key levers 4 converge to a row of plungers 5 in a central position so that each key plunger 5 stands directly above its corresponding character strip in each row as the escapement advances the carriage from row to row. The character strips 10 are adapted to be released by the keys, each dropping down in its own channel to rest on a parallel bar 33 under its row. Beneath each row of boxes 8, that are open or slotted at the ends, the parallel bars 33 operated by the case-shift keys 35 and 45 are raised or lowered so as to position one of the characters on any strip in line with the light channel. As a plunger 5 is lowered its spring 32 moves toward the top of a character strip 10 by which it, because of its shape and resiliency, is pressed to the right (Fig. 2), to press to the right the upright on the release 30. The released strip 10 then drops, the other twenty-nine strips 10 remaining in position. The amount of drop of the released strip 10 is determined by the position of the parallel bar 33 under its particular row. If the bar 33 is in its normal position the strip will be in the position of Fig. 6 with a lower-case letter in line for viewing and photographing. If the key 35 which is in line with the box 8 in question has been depressed one notch, the bar 33 will have been raised so that the lower end of the strip will be in the position of the lower dotted line of Fig. 5, thus bringing the upper-case letter thereon in line for viewing and photographing. If, on the other hand, the key 35 has been depressed two notches, the lower end of the strip will only drop to the position of the upper dotted line of Fig. 5 so as to have its figure in line for viewing and photographing. The case-shifting keys are mounted on the carriage 6 and travel with it. Each row of character-holding boxes 8 are brought in line with the plungers 5 one by one as are spaces on a sheet of paper in a typewriter. Case-shifting can be done at any time, even after the character has been set or selected. The carriage can also be run back so that the box containing the error stands beneath the line of plungers 5 to permit a different strip or character to be selected after returning the originally released strip to its original position by depressing the shift key all the way down. As each character is selected it is immediately viewable by means of the mirrors 18 and 19. When the rows are advanced by plungers 22 and bar 25 all selected characters are in line for photographing purpose.

Pre-justification setting mechanism

The depression of a plunger 5 also results in the selection of one of the elements 52 by contact of the extension 50 from the arm 5 with whichever butt 53 is in the path of the extension of the particular selected arm. By this means a selected element 55 is raised for later actuation of the justifying means at the photographing unit so that the proper space will be allotted to a proper character. Since the space required for lower case, upper case, and "figure" characters differ one from another, it is necessary to have a different set of elements 52 under the extensions 50 depending on which type of character is to be selected. This is assured by shifting (thru the mechanism of Figs. 9 and 10), whenever an upper case letter is selected, a group 62 of elements 52 to the position of the group 51 thereof, by a single-notch depression of the key 35 and by shifting, whenever a "figure" is selected, a group 61 of elements 52 to the position under the extensions 50 by a double-notch depression of a key 35.

Carriage exchange

Two carriages 6c and 6d are provided in the present instance, being mounted respectively on beds 78 and 78d which are horizontally slideable on their frames 9 and 129 which run on a single track 130. The horizontal sliding of the beds under the influence of cams 145 and 147 (Fig. 12) enables them to pass. Accordingly when a line of viewable type on one carriage has been completely set and a line on the other carriage has been completely photographed, the carriages may be interchanged, either manually by the arm 151 or automatically by the motor 160.

Photographing element

Whenever either of the frames 129 and 9 has carried a carriage with its character strips to photographing position it is driven across the lens axis by intermittent movement by employing the Geneva wheel. During the non-active interval of the wheel drive, the continuous action of the drive 204 wheel causes the timing gear 218 to release the escapement-operated shutter. During the active movement of the Geneva wheel the one way trips 104b operate the multiple escapement member, and through the medium of gear 250 and rack 252 thus the photographic-receiving film is moved the width to be occupied by the next character to be exposed. The escapement means, being controlled by the pre-justification setting mechanism, moves the film a distance which is pre-determined in accordance with the width of the character photographed.

Justifying action

By scanning a positioned dot on each spacer strip as it passes on the forward movement in the carriage before a photo-cell, the justifying action takes place during the early portion of the time interval of the advance of the carriage. Thus the space between words is varied by the photo-cell action and escapement, causing a shifting of the holder 203a.

Since certain changes may be made in the above construction and different embodiments of the invention could be made without departing from the scope thereof, it is intended that all matter contained in the above description or shown in the accompanying drawing shall be interpreted as illustrative and not in a limiting sense.

What is claimed is:

1. In a photographic composing machine, a keyboard, photographing means spaced therefrom, a plurality of interchangeable carriages each carrying a plurality of character-bearing elements, means associated with said keyboard for selecting character-bearing elements on any carriage at said keyboard, said photographing means being adapted to photograph when a carriage is at said photographing means the characters previously selected when said carriage was at said keyboard, and means for conducting said carriages past each other from positions at said keyboard and photographing means respectively to positions at said photographing means and keyboard.

2. In a photographic composing machine, a keyboard, photographing means spaced therefrom, a plurality of interchangeable carriages each carrying a plurality of character-bearing elements, means associated with said keyboard for selecting character-bearing elements on any carriage at said keyboard, said photographing means being adapted to photograph when a carriage is at said photographing means the characters previously selected when said carriage was at said keyboard, and means for moving the carriage from said keyboard to said photographing means and for removing a carriage from said photographing means to permit the introduction thereto of the carriage from said keyboard.

3. In a photographic composing machine, a keyboard, photographing means spaced therefrom, a plurality of interchangeable carriages each carrying a plurality of character-bearing elements, means associated with said keyboard for selecting character-bearing elements on whichever carriage is at said keyboard, said photographing means being adapted to photograph when a carriage is at said photographing means the characters previously selected when said carriage was at said keyboard, and means for moving the carriage from said keyboard to said photographing means and for removing a carriage from said photographing means to permit the introduction thereto of the carriage from said keyboard and for introducing at said keyboard the carriage removed from said photographing means.

4. A photographic composing machine comprising a keyboard, a plurality of sets of slides, each set being movable relatively to the keyboard and each slide being movable relatively to the set, the slides being independent of the keyboard and of each other and each slide bearing a plurality of characters, means to select a slide of a set in response to the operation of a key of the keyboard, means to replace one set of slides with another set of slides in response to each selecting action, case-shifting means to determine the positioning of each selected slide so that a particular one of the characters thereon will be positioned for viewing and photographing, escapement means to measure a justified line character-by-character as the keys are operated, storage means to preserve the measuring actuations for the individual characters, means to photograph a line, and escapement means coordinated with the aforesaid escapement means by the storage means to control the operation of the photographing means so that the line will be photographed in a justified manner.

5. A photographic composing machine comprising a keyboard, a plurality of sets of slides, each slide being movable relatively to the set, the slides being independent of the keyboard and of each other and each slide bearing a plurality of characters, means to select a slide of a set in response to the operation of a key of the keyboard, means for successively establishing an operative relationship between individual ones of said sets of slides and the keyboard, means to replace one set of slides with another set of slides in response to each selecting action, and case-shifting means to determine the positioning of each selected slide so that a particular one of the characters thereon will be positioned for viewing and photographing.

6. In a photographic composing machine, a keyboard, a series of sets of vertically movable slides, each slide having thereon a plurality of vertically disposed photographable characters all corresponding to one key of said keyboard, mechanism to select a particular slide of a set in response to the operation of a particular key of said keyboard and thereafter to select particular slides of successive sets as keys are operated successively, each slide normally sliding to a standard position when selected, case-shift keys, and mechanism to cause a slide to slide to another position upon a case-shift-key operation and to slide to still another position upon another case-shift-key operation; whereby indicia including capital letters and lower-case letters and figures may be alined for photographing without disturbing the set-to-set or slide-to-slide or indicia-alinement relationships.

7. In a photographic composing machine a keyboard, a series of sets of vertically movable slides, each slide having thereon a plurality of vertically disposed photographable characters all corresponding to one key of said keyboard, mechanism to select a particular slide of a set in response to the operation of a particular key of said keyboard and thereafter to select particular slides of successive sets as keys are operated successively, each slide normally sliding to a standard position when selected, case-shift keys, and lever mechanism whereby a slide moves to a different vertical position upon a case-shift-key operation and whereby a slide moves to another different vertical position upon another case-shift-key operation; whereby indicia including capital letters and lower-case letters and figures may be alined for photographing without disturbing the set-to-set or slide-to-slide or indicia-alinement relationships.

8. In a photographic composing machine a keyboard, a series of sets of vertically movable slides, each slide having thereon a plurality of vertically disposed photographable characters all corresponding to one key of said keyboard, mechanism to select a particular slide of a set in response to the operation of a particular key of said keyboard and thereafter to select particular slides of successive sets as keys are operated successively, each slide normally sliding to a standard position when selected, case-shift keys, mechanism to cause a slide to slide to another position upon a case-shift-key operation and to slide to still another position upon another case-shift-key operation; whereby indicia including capital letters and lower-case letters and figures may be alined for photographing without disturbing the set-to-set or slide-to-slide or indicia-alinement relationships, justifying means, and photographing means.

9. A photographic composing machine as set forth in claim 5 wherein means are provided for restoring the selected slides.

10. A photographic composing machine as set forth in claim 5 wherein means are provided for viewing the selected characters on the selected slides.

11. A photographic composing machine as set forth in claim 5 wherein correction means are provided for reselecting an individual slide or character.

12. A photographic composing machine as set forth in claim 6 wherein there are provided means for viewing the selected characters on positioned slides, means to photograph the selected characters, and means for reselecting individual slides or characters prior to the operation of the photographing means.

13. A photographic composing machine as set forth in claim 5 wherein the establishing means includes slide-actuating elements, said slide-actuating elements and said sets of slides being mounted for relative movement.

14. A photographic composing machine as set forth in claim 6 wherein there is provided alining means to bring the selected characters into focus for photographing, and means to photograph the characters.

15. A photographic composing machine as set forth in claim 5 wherein there are provided means to measure a justified line character-by-character as the keys are operated, storage means to preserve the measuring actuations for the individual characters, means to photograph a line, and means to control the operation of the photographing means in accordance with the actuations preserved by the storage means so that a line will be photographed in a justified manner.

ASHLEY G. OGDEN.

REFERENCES CITED

The following references are of record in the file of this patent:

UNITED STATES PATENTS

| Number | Name | Date |
| --- | --- | --- |
| 602,439 | Friese-Greene | Apr. 19, 1898 |
| 1,732,049 | Hunter | Oct. 15, 1929 |
| 1,821,466 | Grass | Sept. 1, 1931 |
| 1,893,439 | Ogden | Jan. 3, 1933 |
| 2,010,561 | Ogden | Aug. 6, 1935 |
| 2,115,990 | Jones | May 3, 1938 |
| 2,207,265 | Ogden | July 9, 1940 |
| 2,402,750 | Huebner | June 25, 1946 |